UNITED STATES PATENT OFFICE.

SAMUEL S. SADTLER, OF SPRINGFIELD TOWNSHIP, MONTGOMERY COUNTY, PENNSYLVANIA.

PROCESS OF PRODUCING ALKALI-METAL HYDROXIDS.

1,351,693.    Specification of Letters Patent.    Patented Aug. 31, 1920.

No Drawing.    Application filed March 21, 1919.    Serial No. 284,064.

*To all whom it may concern:*

Be it known that I, SAMUEL S. SADTLER, a citizen of the United States, residing at Springfield township, in the county of Montgomery and State of Pennsylvania, have invented certain new and useful Improvements in Processes of Producing Alkali-Metal Hydroxids, of which the following is a specification.

This invention relates to processes of making alkali metal hydroxids and has special reference to a process of producing such hydroxids and particularly caustic soda by a simple and inexpensive process and from materials which are obtainable in abundance and at a low cost.

In the practice of my process, I employ a dialkali-metal phosphate such as disodium phosphate ($Na_2HPO_4$) and to this I add an alkaline earth-metal hyroxid, ordinarily calcium hydroxid in the form of milk of lime, preferably mixing the materials in approximately the proportions indicated by the following equations:

(a) 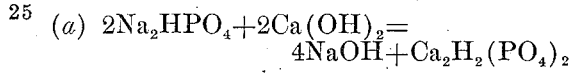

or (b) 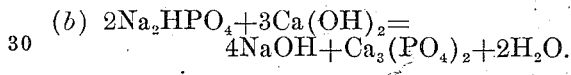

If the calcium hydroxid is employed in a smaller proportion than that indicated by equation $a$, the disodium phosphate will not be wholly converted into dicalcium phosphate. If the proportion of calcium hydroxid employed is greater than that indicated by equation $a$ but less than that indicated by equation $b$ both dicalcium phosphate and tricalicium phosphate will be formed and if the proportion of calcium hydroxid is greater than that indicated by equation $b$ not all of it will be utilized in the reaction and if present in a considerable proportion in the product, its presence will be disadvantageous in the second stage of the process. It will be understood, therefore, that to practice the process satisfactorily and economically, the proportion of calcium hydroxid should not be materially less than that indicated by equation $a$ nor materially greater than that indicated by equation $b$.

The most advantageous proportions of disodium phosphate and calcium hydroxid to be used depends upon the manner in which the second stage of the process is to be carried out. If an alkali metal sulfate such as sodium sulfate, is to be employed, the approximate proportions indicated by equation $a$ should be used and if sulfuric acid and an alkali metal sulfate, such as sodium sulfate, either separately or combined in an acid alkali metal sulfate, such as sodium acid sulfate, are to be employed, the proportions should be approximately those indicated by equation $b$.

As, in the practice of the second stage of my process, I prefer for reasons of economy to employ niter-cake, it will be understood that in the preferred commercial practice of my process the approximate proportions indicated by equation $b$ ordinarily will be followed.

The quantities, therefore, which I prefer to employ in equations $a$ and $b$ are as follows:

In the case of reaction $a$, to 284 pounds of disodium phosphate ($Na_2HPO_4$) calculated to the anhydrous salt I use approximately 148 pounds of pure calcium hydroxid. Of course, I would use a somewhat greater amount of the hydroxid to the extent of any impurities that might be present therein. In the case of reaction $b$, to 284 pounds of the disodium phosphate calculated as the anhydrous salt, I use approximately 222 pounds of pure calcium hydroxid.

In the first stage of my process, as illustrated by equations $a$ and $b$, the disodium phosphate and milk of lime are heated and preferably boiled until the indicated reactions occur, the reactions ordinarily being completed in a few minutes, depending in some measure upon the temperature to which the mixture is heated. The materials may be heated under superatmospheric pressure but this is not necessary. In each case, the products of the reactions are sodium hydroxid and a water insoluble compound of calcium and phosphoric acid. In carrying out this stage of the process, according to equation $a$, the calcium phosphate produced is dicalcium phosphate ($Ca_2H_2(PO_4)_2$) while that produced by equation $b$ is tricalcium phosphate ($Ca_3(PO_4)_2$).

The sodium hydroxid liquor is separated from the insoluble calcium phosphate and concentrated to any desired strength by evaporation. Any unchanged disodium phosphate remaining in the dicalcium phosphate may be washed out and the wash liquor treated with the necessary amount of milk of lime. Similarly, any unchanged disodium phosphate in the separated sodium hydroxid solution may be gotten rid of by the use of the necessary amount of milk of lime, the calcium phosphate being precipitated.

As disodium phosphate readily reacts with calcium hydroxid it is a relatively easy matter to get rid of practically all of the disodium phosphate without using a material, or ordinarily, any appreciable excess of calcium hydroxid, in a two-step operation.

In the second stage of my process, the calcium phosphate which is either dicalcium or tricalcium phosphate, produced in the first stage, is treated with an alkali metal sulfate, as sodium sulfate, and if the tricalcium phosphate is employed, it is preferably treated with both sodium sulfate and sulfuric acid, either separately or combined.

In making use of dicalcium phosphate, I treat it at an elevated temperature, with a solution of sodium sulfate, of any desired strength, as for example, of 20° Bé., in the approximate proportions indicated by the following equation:

(c) 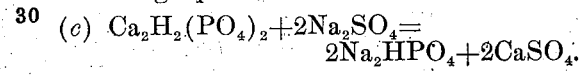

To 272 pounds by weight of pure dicalcium phosphate $(Ca_2H_2(PO_4)_2)$, I use approximately 284 pounds of sodium sulfate calculated as the anhydrous salt.

The treatment is continued until an approximately theoretical yield of disodium phosphate is obtained.

In making use of tricalcium phosphate, I may treat it with sulfuric acid in approximately the proportions indicated by the following equation, to first produce dicalcium phosphate:

(d) 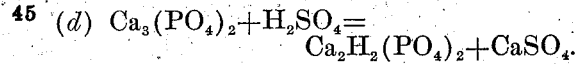

In this treatment, it is not necessary to apply heat to the mixture but heat may be applied to hasten the reaction, if desired.

The dicalcium phosphate is then treated with sodium sulfate, as already described (see reaction c.)

Instead of carrying out the last two reactions separately, I prefer to effect the production of the disodium phosphate in a single operation, making use of sodium sulfate containing sulfuric acid, known commercially as niter-cake and in this case, reactions c and d proceed simultaneously.

In making use of niter-cake, which, as stated, contains both the sodium sulfate and the sulfuric acid required in reactions c and d, to 310 pounds of pure tricalcium sulfate $(Ca_3(PO_4)_2)$, I use approximately 389 pounds of niter-cake, containing about 28 per cent. of available sulfuric acid. The process may be carried out with a little more acid or a little less, but my preferred practice is to so adjust the proportions with respect to the addition of sodium sulfate or sodium sulfate and sulfuric acid so as to get approximately the proportions herein set forth; that is to say, a little more than the theoretical amount of sodium sulfate or sodium sulfate and sulfuric acid, as indicated in the reactions and for practical reasons I find it best to use some excess.

Owing to the incompleteness of the reaction of dicalcium phosphate and sodium sulfate, successive applications of the sodium sulfate or niter-cake are ordinarily necessary. Such successive applications are carried out by the well known methods of series extraction or digestion. I also prefer to treat the materials in this stage of the process at above a boiling temperature, preferably under a pressure of about three atmospheres, although some measure of success may be obtained at lower temperatures.

The resulting disodium phosphate solution is preferably separated from the calcium sulfate at normal pressure and at a boiling temperature but the separation may advantageously be made under superatmospheric pressure, if desired, and for mechanical reasons, this might be advantageous in some cases.

The calcium sulfate produced after being preferably washed and dried, is useful in the arts.

From the foregoing description, it will be understood that the principal product sought to be obtained by my process is an alkali metal hydroxid, ordinarily caustic soda, the calcium sulfate or "gloss white" being a by-product, and that the phosphoric acid salt produced is obtained as an intermediate product and is converted into a dialkali metal phosphate, ordinarily disodium phosphate, which is employed in the first stage of my process and takes its part in the cycle of operations, theoretically without loss.

I have found that some measure of success may be obtained by the use of any other alkali metal salts capable of uniting with the dicalcium or other dialkaline earth metal phosphate employed in the second stage of my process to form a substantially insoluble salt with the calcium or other alkaline earth metal present therein. For example, some measure of success is obtainable by using an alkali metal sulfite, citrate or tartrate, as, for example, sodium sulfite, sodium citrate or sodium tartrate, in place of sodium sulfate and where calcium hydroxid is employed in the first stage of my process, the results are such as to indicate that this procedure is of substantial practical value.

I have also found that some measure of success may be obtained by the use of any acid capable of transforming tricalcium phosphate into dicalcium phosphate instead of sulfuric acid and that such acid may be employed either free or combined in an acid salt. Among the acids which may be used are sulfurous and hydrochloric acids.

While, for the purpose of illustration, I have described in detail the preferred practice of my process, it is to be understood that the use of dialkali metal phosphates other than disodium phosphate, alkaline earth metal hydroxids other than calcium hydroxid and alkali metal salts capable of forming a substantially insoluble salt with calcium other than sodium sulfate, is contemplated as within the purview of my invention and that the proportions of reagents and details of procedure as hereinbefore specifically set forth may be varied without departing from the spirit of my invention or the scope of the subjoined claims.

Having described my invention, I claim:

1. The process of producing an alkali metal hydroxid which consists in reacting upon disodium phosphate with calcium hydroxid in the approximate proportions of from 148 to 222 parts by weight of the hydroxid to 284 parts by weight of the phosphate.

2. The herein described process which consists in reacting upon a dialkali metal phosphate with an alkaline earth metal hydroxid, subjecting the solid portion of the product to the action of an alkali metal salt of an acid adapted to form a substantially water insoluble salt with calcium at an elevated temperature, and separating the solid from the liquid portion of the product.

3. The herein described process which consists in reacting upon a dialkali metal phosphate with an alkaline earth metal hydroxid, subjecting the solid portion of the product to the action of an alkali metal salt of an acid adapted to form a substantially water insoluble salt with calcium at above 100° C. and under superatmospheric pressure, and separating the solid from the liquid portion of the product.

4. The herein described process which consists in reacting upon a dialkali metal phosphate with an alkaline earth metal hydroxid, subjecting the solid portion of the product to the action of an alkali metal salt of an acid adapted to form a substantially water insoluble salt with calcium at an elevated temperature, and an acid, and separating the solid from the liquid portion of the product.

5. The herein described process which consists in reacting upon a dialkali metal phosphate with an alkaline earth metal hydroxid, subjecting the solid portion of the product to the action of sodium sulfate, and separating the solid from the liquid portion of the product.

6. The herein described process which consists in reacting upon a dialkali metal phosphate with an alkaline earth metal hydroxid, subjecting the solid portion of the product to the action of niter cake in the approximate proportions of 310 parts by weight of the former to 389 parts by weight of the latter, and separating the solid from the liquid portion of the product.

7. The herein described process which consists in reacting upon a dialkali metal phosphate with calcium hydroxid, subjecting the solid portion of the product to the action of an alkali metal salt of an acid adapted to form a substantially water insoluble salt with calcium at an elevated temperature, and separating the solid from the liquid portion of the product.

8. The herein described process which consists in reacting upon disodium phosphate with an alkaline earth metal hydroxid, subjecting the solid portion of the product to the action of an alkali metal salt of an acid adapted to form a substantially water insoluble salt with calcium at above 100° C., and separating the solid from the liquid portion of the product.

9. The herein described process which consists in reacting upon disodium phosphate with calcium hydroxid, subjecting the solid portion of the product to the action of an alkali metal salt of an acid adapted to form a substantially water insoluble salt with calcium at above 100° C. and separating the solid from the liquid portion of the product.

10. The herein described process which consists in reacting upon disodium phosphate with calcium hydroxid in the approximate proportions of 222 parts by weight of the hydroxid to 284 parts by weight of the phosphate, subjecting the solid portion of the product to the action of niter-cake in the approximate proportions of 310 parts by weight of the former to 389 parts by weight of the latter, and separating the solid from the liquid portion of the product.

In testimony whereof I affix my signature in presence of two witnesses.

SAMUEL S. SADTLER.

Witnesses:
 OLAS E. WINTERS,
 GEO. A. REITZ.